June 28, 1955  H. G. DOSTER  2,711,877
GATE VALVES
Filed Feb. 15, 1954  4 Sheets-Sheet 3
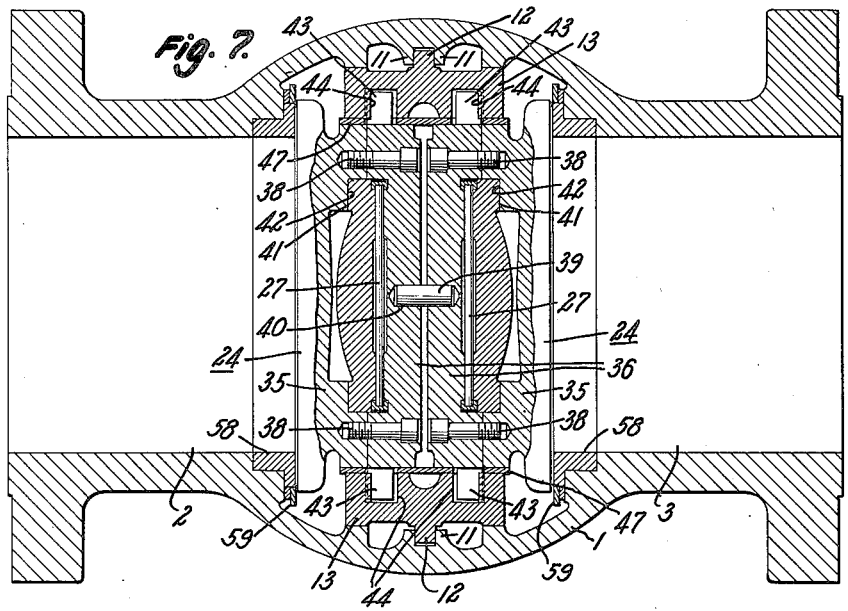
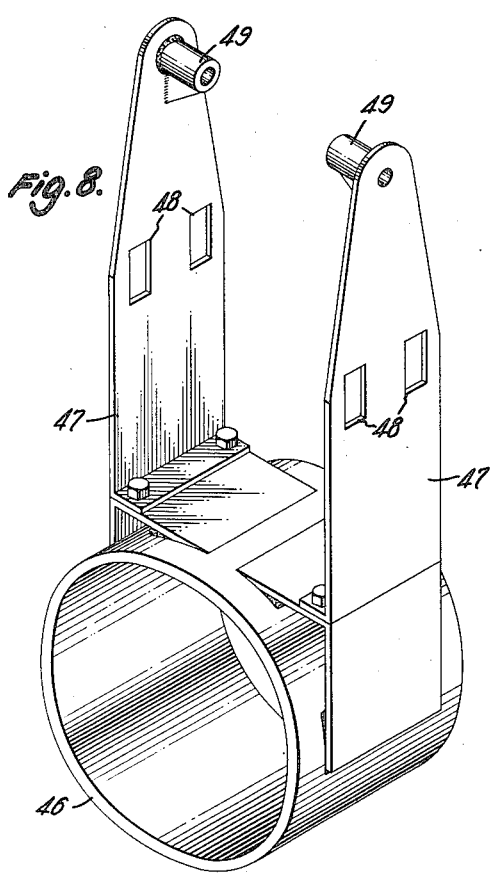
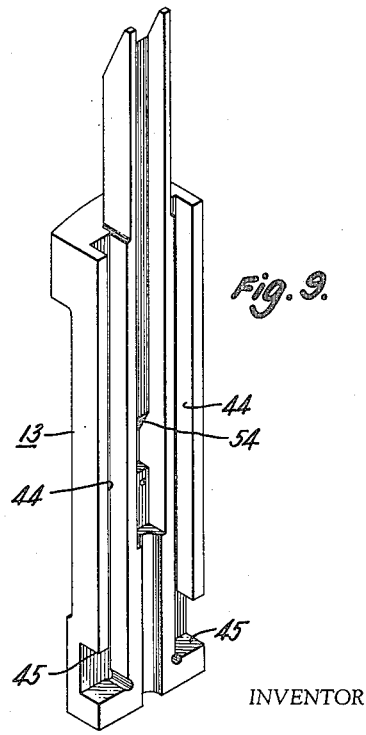
INVENTOR
Howard G. Doster
BY
ATTORNEY June 28, 1955  H. G. DOSTER  2,711,877
GATE VALVES
Filed Feb. 15, 1954  4 Sheets-Sheet 4
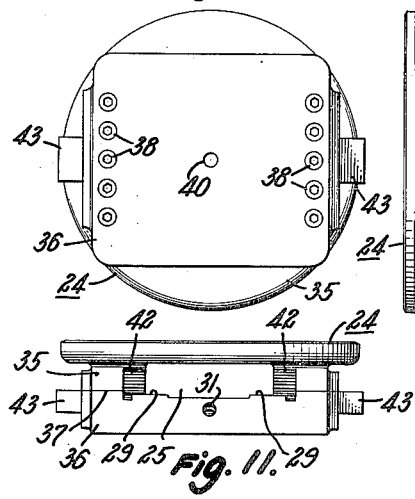
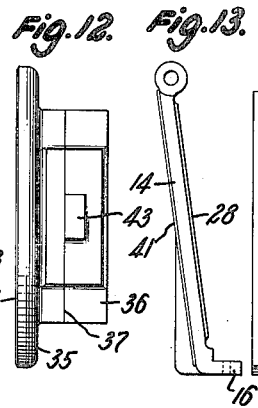
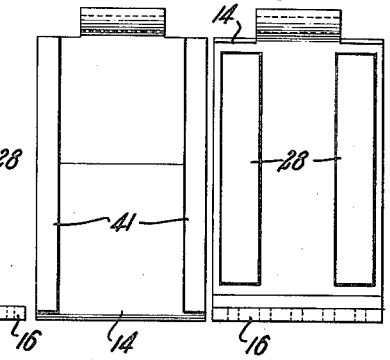
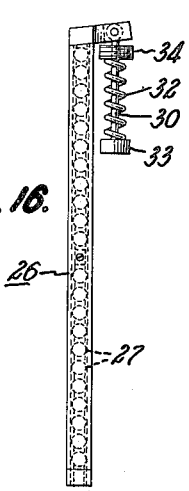
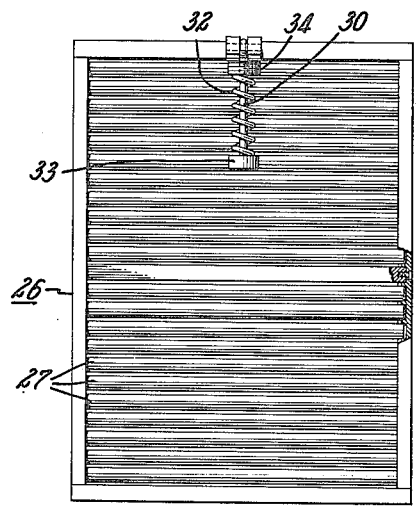
INVENTOR
Howard G. Doster
BY
ATTORNEY

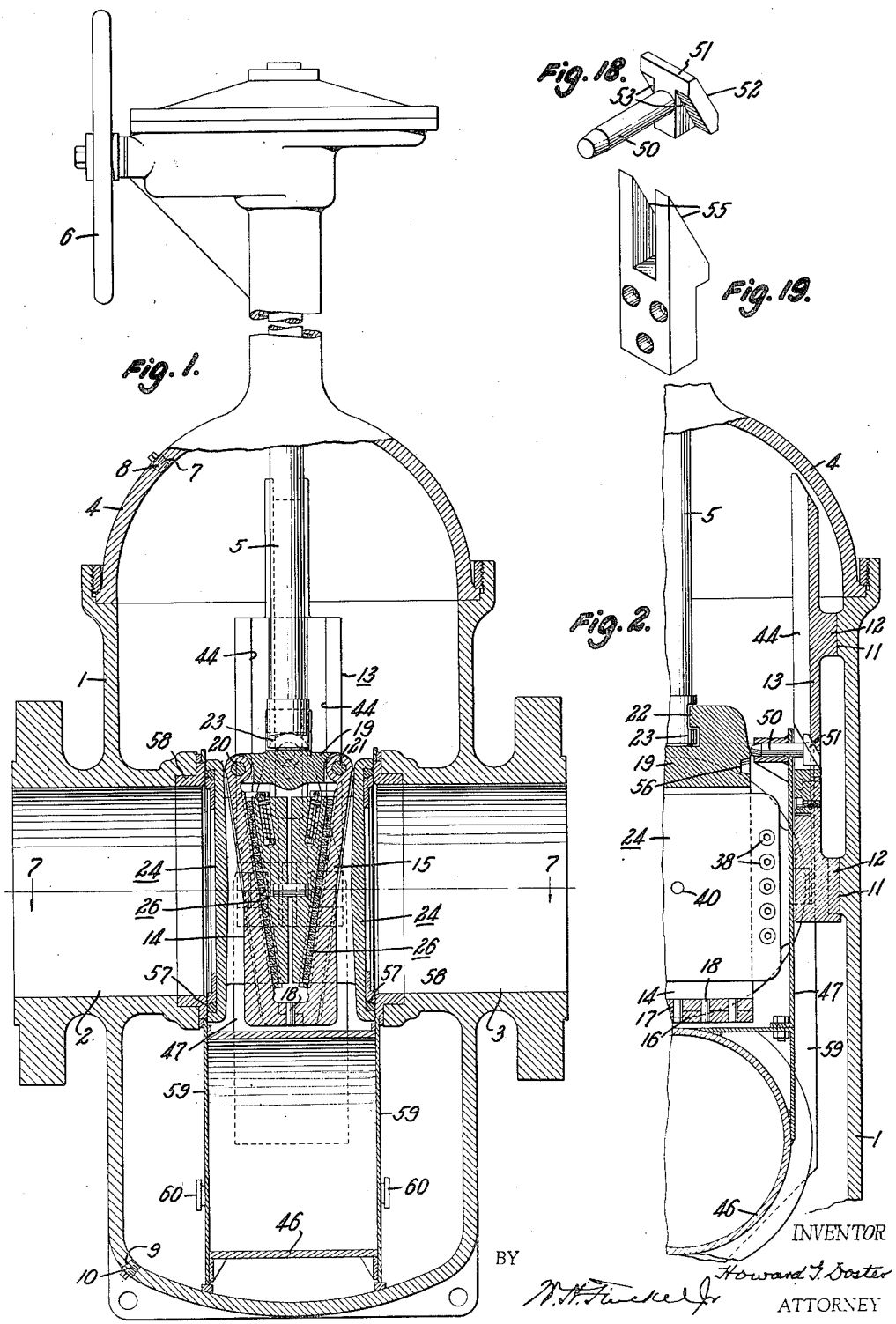

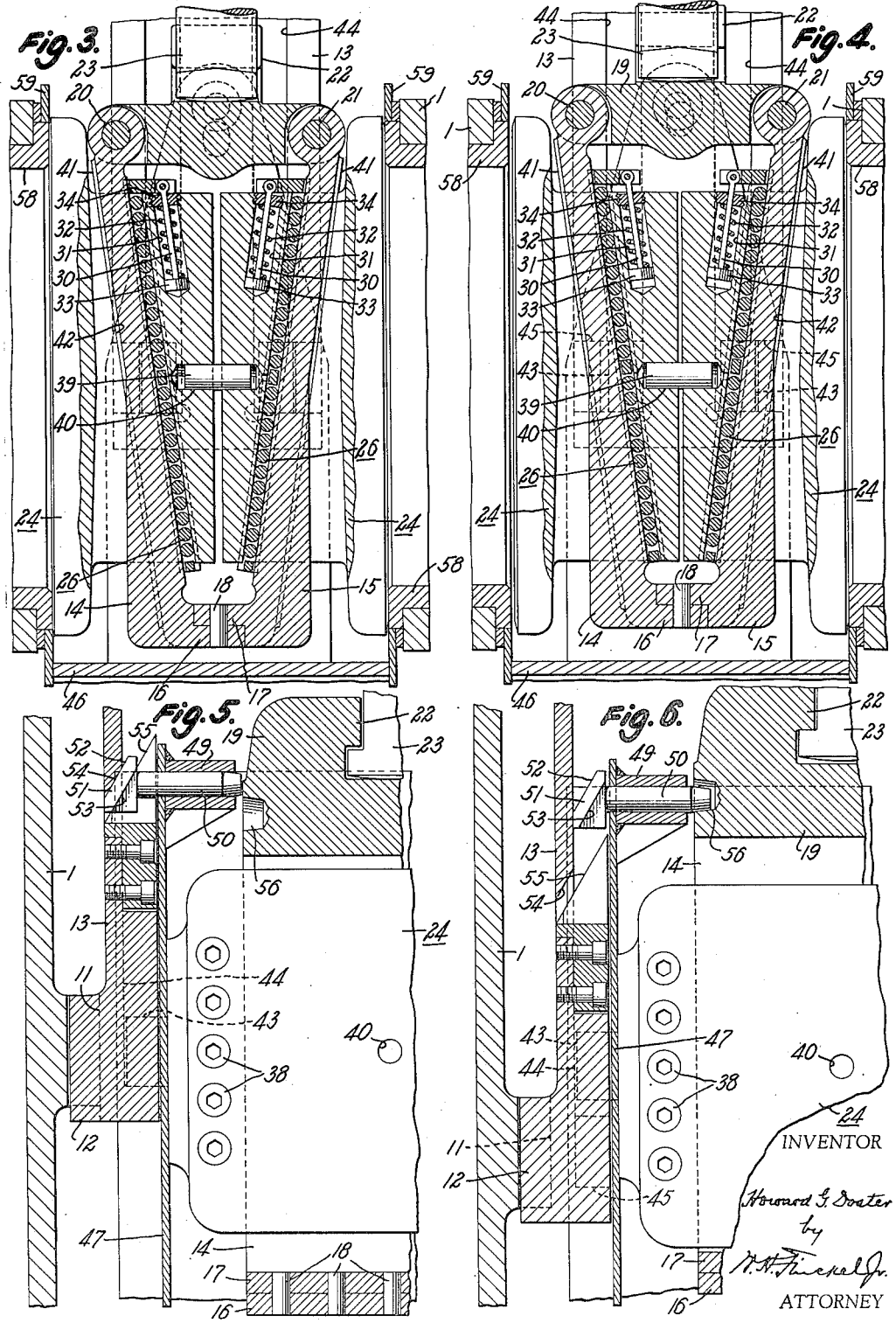

United States Patent Office 2,711,877
Patented June 28, 1955

2,711,877

GATE VALVES

Howard G. Doster, Wadsworth, Ohio, assignor to The Ohio Injector Company, Wadsworth, Ohio, a corporation of Ohio Application February 15, 1954, Serial No. 410,109

3 Claims. (Cl. 251—197)

This invention relates to fluid flow control valves, and it has special reference to gate valves of the type disclosed generally in the copending application of Charles Wheatley for patent for Gate Valve, filed April 23, 1951, now Patent No. 2,676,780, dated April 27, 1954, and in applicant's copending application for patent for Gate Valve, filed February 15, 1954, Serial No. 410,198, but embodying modifications of structure and operational functions thereover.

One object of the invention is to provide a gate valve in which the valve discs are furnished with yieldable seating, sealing members, and including operating mechanism for such discs whereby the seating thereof with most advantageous operation of such yieldable seating, sealing members may be obtained.

Another object of the invention is to provide a gate valve of a construction particularly well adapted for embodiment in valves of large size and/or for handling fluids at high pressure.

A further object is to provide in a gate valve of the type referred to a so-called conduit member for alignment with the valve ports when in open-valve condition, and an assembly wherein such conduit member and the valve discs are connected for simultaneous valve-opening and valve-closing movement, including means for separably connecting such assembly with a functional counterpart of the usual wedge member whereby the assembly may move relatively to, and also simultaneously with, the wedge member, and may be fixed with relation to the valve body when in closed-valve condition.

Still another object of the invention, as in the above-identified copending applications of Wheatley and of applicant, is to provide an arrangement of antifriction bearing means between the wedge member and valve discs for the purpose of facilitating and making more positive the relative movement of these parts during opening and closing of the valve, and for reducing operating effort to a minimum.

A still further object of the invention is to provide means for automatically controlling operation of the antifriction bearing means, whereby their restoration to a normal position for proper functioning after their displacement from such normal position during relative movement between the wedge member and valve discs may be provided for.

Another object is to provide for such construction of the moving parts of the valve, and of fixed parts complemental thereto, that assembly and disassembly thereof may be readily accomplished, thereby facilitating manufacturing and servicing practices.

Other objects and structural features and the attendant advantages will be apparent from the following description and the appended claims.

In the accompanying drawings illustrating the invention, in the several figures of which like parts are similarly designated, Fig. 1 is an axial vertical sectional elevation of a valve embodying the features of the invention, Fig. 2 is a fragmentary axial sectional elevation of the valve taken in a plane at 90° to the showing of Fig. 1, Fig. 3 is an enlarged fragmentary sectional elevation showing the wedge member and disc means of the valve as illustrated in Fig. 1, Fig. 4 is a view similar to Fig. 3 but showing such relative displacement of the wedge member and disc means as will serve to permit unseating the upstream disc, Fig. 5 is an enlarged fragmentary sectional elevation showing the wedge member and disc means as illustrated in Figs. 1 and 3, Fig. 6 is a view similar to Fig. 5 but showing the means for coupling the wedge means and disc means in engagement, Fig. 7 is a transverse sectional elevation taken in the plane of line 7—7, Fig. 1, Fig. 8 is a perspective view of the conduit member and the means for its assembly with the disc means, Fig. 9 is a perspective view of one of the guide members affixed to the valve body, Figs. 10, 11 and 12 are, respectively, a rear elevation, a side elevation, and a top elevation of one of the valve discs, Figs. 13, 14 and 15 are, respectively, a side elevation, a rear elevation, and a front elevation of one of the arms (the left-hand arm, Figs. 1, 3 and 4) of the wedge member, Figs. 16 and 17 are, respectively, a side elevation, and a front elevation of a practical form of antifriction bearing assembly, Fig. 18 is a perspective view of one of the locking pins of the valve disc and conduit assembly, and Fig. 19 is a perspective view of one of the fixed cam members for operative engagement by a locking pin.

The valve body 1 is provided with fluid flow ports 2 and 3 serving alternatively as inlet and outlet ports and it has a bonnet 4 and a valve stem 5 provided with suitable operating mechanism including a hand wheel 6 or other power applying member. The bonnet 4 has an opening 7 closed by a plug 6 for the introduction of a suitable lubricant, such as a light grease, to substantially fill the body and bonnet, and a drain opening 9 located in the bottom of the body, and closed by a plug 10, furnishes a means whereby accumulated moisture may be drained from the body.

Attached to the side walls of the body 1, preferably by welding to lugs 11 and 12, is a pair of similar guide members 13 (Figs. 2, 5 to 7 and 9) diametrically oppositely disposed and provided with guide channels and cam surfaces the purposes of which will hereinafter appear.

Disposed transversely of the axes of the body ports 2 and 3 is the wedge member which, for ease of manufacture and assembly, comprises two substantially similar downwardly converging arms 14 and 15 provided at their lower ends with complemental stepped connecting flanges 16 and 17, respectively, pierced for the reception of securing pins 18. The upper, divergent ends of these arms 14 and 15 are connected to a yoke member 19 by pins 20 and 21, and this yoke member is provided with jaws 22 for engagement with the head 23 of the valve stem 5 wherethrough reciprocation of the wedge member may be derived for effecting the opening and closing movements of the valve ports. The formation of the jaws 22 and their association with the head 23 of the valve stem provide for relative lateral shifting movement of these parts for a purpose hereinafter appearing.

Assembled upon each of the arms 14 and 15 is a valve disc member 24 (Figs. 10 to 12) provided with a downwardly extending and inwardly inclined passage 25 within which are assembled the respective arm (14, 15) of the wedge and appropriate assemblies of antifriction bearing means 26 including series of spaced rollers 27 having diametrically opposite rolling bearing surfaces 28 and 29 on the arms of the wedge member and upon the disc members 24. During operation of the valve the antifriction bearing assemblies will, by virtue of their rolling contact with their bearing surfaces 28 and 29, become longitudinally displaced with respect to the disc means and the respective arms of the wedge member, and in order that they may then be restored to, and may ordinarily assume, a normal position of operation, they are provided with spring-return means including rods 30 operating in bores 31 in the disc members and surrounded by compression springs 32 confined between heads 33 carried by the rods 30 and stop collars 34 screwthreaded into the bores 31.

For ease of assembly, it will be noted that the disc members 24 are formed in two parts, namely the disc member proper 35 and a back plate 36, with their line of separation 37 intersecting the passage 25 disposed between them. These two parts are secured together by a plurality of cap screws or bolts 38.

When assembled with the wedge member, the disc members 24 are preferably maintained in axial alignment with each other by center pins 39 confined for free floating movement in sockets 40 provided in the adjacent opposed faces of the disc members.

The arms 14 and 15 of the wedge member are provided with wedging surfaces 41 for cooperation with complemental wedging surfaces 42 on the disc members 24.

The disc members 24 are provided with laterally oppositely offstanding guide lugs 43 for guided travel in the guide channels 44 of the guide members 13 (Fig. 9), and these channels 44 terminate at their lower ends in offset locking sockets 45 in a manner later appearing herein.

The conduit member 46 (Fig. 8) is provided with plates 47 adapted in the assembly of parts to flank the disc members 24, and these plates 47 are provided with apertures 48 through which the guide lugs 43 will project outwardly of the plates 47 and into operative engagement within the guide channels 44 of the guide members 13. It will be apparent from an inspection of Figs. 3 to 8 that although the apertures 48 are of a height to closely engage the upper and lower surfaces of the guide lugs 43 of the disc members 24, in order that travel of the attached conduit member will coincide with that of the disc members, their width is greater than the width of these guide lugs, thereby making possible a limited relative movement of the disc members as will be described hereinafter.

In order to provide mechanism for interlocking the valve disc and conduit assembly and the wedge member during portions of their movement in opening and closing the valve, the plates 47 are provided at their upper ends which project in proximity to the yoke member 19 of the wedge member with slide bearings 49 carrying axially shiftable pins 50 (Figs. 5, 6, and 18) the outer ends of which are provided with cam-follower heads 51 having opposite cam-contacting faces 52 and 53 for engagement, respectively, with cam members 54 and 55 (Figs. 5, 6 and 19) mounted in fixed relation to the valve body 1 on the guide members 13. The opposite ends of the pins 50 are adapted for engagement within sockets 56 in opposite sides of the yoke member 19 (Figs. 2, 5 and 6).

As shown in Fig. 1, the disc members 24 have their seating faces provided with yieldable seating, sealing rings 57 for insuring a proper fluid seal when the discs are seated upon the seat members 58 of the ports 2 and 3, and, as in applicant's copending applications hereinbefore referred to, the seating and unseating of these members is effectively controlled by the relative movement between the wedge member and discs with the interposed antifriction bearing means 26.

Also, guide and sealing plates 59 (see particularly Figs. 1 and 2) embracing the body ports 2 and 3 serve to partially enclose the disc and conduit assembly during valve opening and closing movement thereof. These plates are resiliently biased toward this assembly by yieldable pressure means 60 (Fig. 1).

In operation, assuming that the disc means 24 are in fully seated closed-valve position as shown in Figs. 1 to 3 and 5, and having reference particularly to Figs. 3 and 5, it will be seen that their lugs 43 have been moved into the offsets 45 of the guide channels 44, thus locking the discs with their axes in axial alignment with the axes of the ports 2 and 3 of the body, this having been accomplished by the wedging action of the complemental wedging surfaces 41 and 42 of the arms 14 of the wedge member and the disc means 24, respectively.

When the hand wheel 6, or other appropriate power-applying means, is actuated to open the valve, the initial upward travel of the valve stem 5, carrying with it the wedge member, will relieve the wedging action between the wedge member and discs, and the disc at the upstream port 2 will be slightly unseated axially of the port, as shown in Fig. 4, under the influence of line pressure, this pressure meanwhile maintaining the disc at the downstream port 3 in seated condition. This movement of the upstream disc 24 axially of the port 2 will be accommodated by shifting of the jaws 22 of the yoke member 19 with respect to the head 23 of the valve stem (see Fig. 4) and will cause the disc lugs 43 to be substantially vertically aligned with the respective channels 44 of the guide members 13 (Fig. 4). Continued upward movement of the wedge member will thereafter, by its interaction through the antifriction bearing means 26, cause the downstream disc to be withdrawn from its seat and the lugs 43 of both discs will then be vertically aligned with the respective channels 44 of the guide members 13 for subsequent guiding engagement therewith.

Thereafter, as the wedge member progresses in its rising movement, its pin sockets 56 will be brought into alignment with the shiftable pins 50 of the disc and conduit assembly and, carrying with it this assembly through the instrumentality of the antifriction bearing means 26, will cause the inner ends of the pins 50 to engage these sockets 56 as the faces 52 of the pin heads 51 travel over the cam surfaces 54 of the guide members 13 (Fig. 6). Thereafter, the disc and conduit assembly, being locked to the wedge member, and suspended therefrom, by this pin and socket connection 50—56, will continue upward travel until the axis of the conduit member is in alignment with the axes of the body ports 2 and 3, the discs meanwhile being guided vertically by travel of their guide lugs 43 in the channels 44 of the guide members 13, and the valve is in fully open condition.

In closing the valve, downward movement of the wedge member, under the influence of the valve stem 5, will carry with it the disc and conduit assembly as a unit, by virtue of the pin and socket connection 50—56, until the cam face 53 of the pin head 51 engages and slides over the cam member 55 (Figs. 5, 18 and 19) whereupon this pin and socket connection will be disengaged, descent of the disc and conduit assembly will be arrested, and the wedge member, through the interaction of the wedge means, the antifriction bearing means, and the cooperating wedging surfaces 41 and 42 of the wedge arms 14 and discs 24, respectively, will force the discs to their seats at the ports 2 and 3.

It will be understood that as the disc, wedge and conduit assembly travels for opening and closing the valve the body of lubricant within the valve body will, in part, be displaced downwardly and upwardly, respectively, thus serving to maintain desired established pressure conditions within the valve body tending to prevent possible undesired leakage of pressure fluid in the line into the valve body.

Also, the approach of the discs to their seats under the influence of the wedge means and antifriction bearing means, and in the presence of line pressure, is such that seating of the yieldable seating, sealing means 57 successively upon the seat member 58 at the downstream and upstream body ports 3 and 2, respectively, is such that this seating may, in a sense, be accomplished progressively, to thus guard against possible injury to the seating, sealing members. Conversely, unseating of the discs is similarly accomplished, with concomitant guarding against injury to the seating, sealing members. Thus the life of the seating, sealing members is prolonged and effective trouble-free operation of the valve maintained over long periods of time.

Various changes and modifications are considered to be within the principle of the invention and the scope of the following claims.

What I claim is:

1. In a gate valve, a body having an inlet port and an outlet port, seat means associated with said ports, and a gate structure having means operative to effect the opening and closing of said valve, said gate structure including a wedge member and a valve stem connected therewith and functioning to impart to said wedge member reciprocative movement transversely of the axes of said ports, disc means associated with said wedge member for movement therewith and relatively thereto, normally contacting cooperating wedging bearing surfaces on said wedge member and disc means respectively normally spaced bearing surfaces on said wedge member and disc means respectively, antifriction bearing means interposed between said spaced bearing surfaces and including elements for rolling contact therewith, said antifriction bearing means having a position of normal relation to said spaced bearing surfaces and being displaceable from such position in the presence of relative movement between said wedge member and disc means, and resilient means serving to bias said anti-friction bearing means to such normal position.

2. In a gate valve, a body having an inlet port and an outlet port, seat means associated with said ports, and a gate structure having means operative to effect the opening and closing of said valve, said gate structure including a wedge member and a valve stem connected therewith and functioning to impart to said wedge member reciprocative movement transversely of the axes of said ports, disc means associated with said wedge member for movement therewith and relatively thereto, normally contacting cooperating wedging bearing surfaces on said wedge member and disc means respectively, normally spaced bearing surfaces on said wedge member and disc means respectively, antifriction bearing means interposed between said spaced bearing surfaces and including elements for rolling contact therewith, said anti-friction bearing means having a position of normal relation to said spaced bearing surfaces and being displaceable from such position in the presence of relative movement between said wedge member and disc means, and resilient means reacting between said antifriction bearing means and said disc means and serving to bias said antifriction bearing means to such normal position.

3. In a gate valve, a body having an inlet port and an outlet port, seat means associated with said ports, and a gate structure having means operative to effect the opening and closing of said valve, said gate structure including a wedge member and a valve stem connected therewith and functioning to impart to said wedge member reciprocative movement transversely of the axes of said ports, disc means associated with said wedge member for movement therewith and relatively thereto, and antifriction bearing means interposed between said disc means and wedge member, said wedge member comprising two similar arms disposed in downwardly converging arrangement and connected at their upper and lower ends, the connection at their upper ends furnishing means for operative union of the wedge member with said valve stem, said disc means being substantially of yoke form providing spaces to receive the arms of said wedges and said interposed antifriction bearing means, and being formed in two separable but normally rigidly connected parts with the lines of division of the parts substantially intersecting said spaces, whereby assembly with them of the arms and antifriction bearing means may be facilitated.

References Cited in the file of this patent

UNITED STATES PATENTS

| 275,798 | Beaumont | Apr. 17, 1883 |
| 2,306,490 | Noble | Dec. 26, 1942 |
| 2,583,512 | Laurent | Jan. 22, 1952 |